United States Patent [19]

Weltman et al.

[11] 3,862,047
[45] Jan. 21, 1975

[54] METHOD AND COMPOSITION FOR DETECTING FLAWS IN METALLIC SURFACES, HOLES AND OTHERWISE

[75] Inventors: Henry J. Weltman; Mark T. Carroll; John E. Halkias; William T. Kaarlela; Jack D. Reynolds, all of Fort Worth, Tex.

[73] Assignee: General Dynamics Corporation, Fort Worth, Tex.

[22] Filed: Apr. 26, 1972

[21] Appl. No.: 247,893

Related U.S. Application Data

[62] Division of Ser. No. 61,191, Aug. 5, 1970, abandoned.

[52] U.S. Cl............. 252/62.52, 73/104, 252/62.54, 324/38
[51] Int. Cl.............................................. H01j 1/28
[58] Field of Search...................... 252/62.52, 62.54

[56] References Cited
UNITED STATES PATENTS
2,601,212  6/1952  Polydoroff...................... 252/62.54
2,744,040  5/1956  Altmann.......................... 252/62.54
2,791,561  5/1957  Beller et al..................... 252/62.54
3,087,832  4/1963  Fogle.............................. 252/62.54
3,345,564  10/1967 Makino et al...................... 324/38

OTHER PUBLICATIONS

Noll Chemistry and Technology of Silicones, Academic Press, N.Y., N.Y., 1968 p. 397-9

Primary Examiner—Patrick P. Garvin
Assistant Examiner—A. P. Demers
Attorney, Agent, or Firm—Charles E. Schurman

[57] ABSTRACT

A procedure for examining and inspecting drilled holes or other metal surface conformations by applying a castable, two component, magnetically active material comprised of room temperature vulcanizing rubber or a polymerizing material containing magnetizable particles and specific sensitizing agents, magnetizing the area to be inspected, and curing the castable material to form a permanent replica impression of the inspection area which, when removed, reveals the presence of surface flaws, such as cracks, scratches, tool marks or dimensional inaccuracies and subsurface flaws which may tend to develop in structurally deficient members.

11 Claims, 6 Drawing Figures

PATENTED JAN 21 1975

INVENTOR
HENRY J. WELTMAN
BY
Charles C. Woodward
ATTORNEY

INVENTOR
HENRY J. WELTMAN
BY
ATTORNEY

METHOD AND COMPOSITION FOR DETECTING FLAWS IN METALLIC SURFACES, HOLES AND OTHERWISE

This application is a division of application Ser. No. 61,191, filed Aug. 5, 1970, now abandoned.

BACKGROUND OF THE INVENTION

The present invention relates generally to a procedure for visually inspecting drilled holes or other metal surfaces.

More particularly, this invention relates to inspection procedures wherein suitable organic mixtures such as rubber, to which sensitizing agents, or magnetic particles, are utilized in conjunction with applied magnetism techniques to cast replicas or impressions of metal surfaces and the interior of holes or apertures contained in metallic parts.

Magnetic particle inspection of critical steel parts has been an accepted non-destructive testing practice within the aerospace industry for many years. The most commonly known method previously utilized consisted of coating the area desired to be inspected with a suspension of magnetic iron oxide suspended in a volatile, petroleum type solvent or introducing the magnetic particles to the proposed test area as a dry powder. After coating, and regardless of whether the magnetic particles were disseminated by the liquid or the powdered method, the area to be tested was magnetized in a known direction. The magnetic particles, upon application of the magnetic field, migrate to the secondary magnetic fields created by any flaws or discrepancies which are present. The magnetic particles become aligned over any defect because of an interruption of the magnetic lines of flux in the component or area affected, thus disclosing the presence of the defect or irregularity. This process as described is generally not applicable to inspection of the internal surfaces of drilled holes and is necessarily limited to use upon readily accessible flat surfaces.

Normal magnetic particle inspection, as thus described, provides visual indications of surface defects or irregularities because the particles concentrate at the defective area. It is possible to enhance visibility by coating the magnetic particles with a dye. This method is known to the industry as Magnaflux. Of even further assistance is the process known as Magnaglow, wherein the magnetic particles are coated with a fluorescent dye and detection is accomplished under ultraviolet light.

None of the methods previously described provide a permanent record. The part may be photographed to record the indication, but this is frequently impossible or at best difficult and time consuming.

In the past few years techniques have been developed which permit the aligned particles on the component to be transferred to a plastic film, thus providing a permanent record of the area inspected. This process, however, is still not applicable to the internal surfaces of drilled holes or other non-planar configurations.

A further variation exists wherein a type of plastic, such as polyvinyl alcohol dispersed in a volatile solvent, is cast on top of an area to be inspected. When the solvent evaporates, the resultant layer is reinforced and removed and the presence of defects is detectable. These types of castings, while permanent, are, as compared to the method hereinafter disclosed, relatively difficult to remove. Of further disadvantage is their limitation in use to top horizontal planes and total lack of useability in the inspection of deep or threaded holes. Additionally the volatility of the solvent is an undesirable characteristic.

It becomes obvious that many disadvantages are inherent in the aforedescribed variations of inspection techniques. Frequently the specimen or component may be so located as to prohibit the utilization of volatile liquids. Small flaws require magnification up to 10 power for detection and microscopic examination of the interior of a recess is difficult because of the positioning requirements of scope and lighting. Holes or other areas to be inspected are often in locations which are inaccessible for visual examination. They are also not generally adaptable to visual examination because of position, size of contour as, for example, in the case of small or threaded holes. Previously known methods present a difficulty in distinguishing between cracks and scratches and fail to provide an easily obtainable permanent record of the inspection. Generally, they also require a strong magnetic field which is potentially harmful for on-aircraft inspections.

Therefore, the primary object of this invention is to provide a method and composition for determining flaws in holes and other metal surfaces by forming cast replicas or impressions of the surface of the area desired to be inspected.

A further objective of this invention is to provide a non-destructive inspection method for the detection of cracks, irregularities and other imperfections in relatively inaccessible holes or areas of a component.

An additional object of this invention is to provide a method of detecting flaws, irregularities and other defects in metallic surfaces and holes wherein a permanent record of inspection is obtained which is capable of indefinite storage without deterioration.

A further object of this invention is to provide a method of inspection which is highly accurate in definition and affords clear and ready identification of each type of flaw.

A still further object of this invention is to provide a method of detecting flaws in metallic surfaces and holes which is safe in use and requires no volatile liquids.

A still further object of this invention is to provide a method for the inspection of metallic components, parts and holes which does not require the utilization of strong magnetic fields which are potentially harmful in on-aircraft inspection.

An additional object of this invention is to provide a non-destructive testing method that will indicate where failure is likely to occur by detecting the presence of a subsurface flaw not detectable by visual inspection.

Another object is to provide an inspection technique requiring only minor initial equipment installation, practically no maintenance requirements and very little operator training.

BRIEF DESCRIPTION OF THE DRAWINGS other objects and advantages of this invention will become readily apparent to those skilled in the art from a consideration of the following specification, appended claims and accompanying drawings, the drawings being illustrative of typical applications of the composition, wherein:

DESCRIPTION OF PREFERRED EMBODIMENTS

Figure 1:
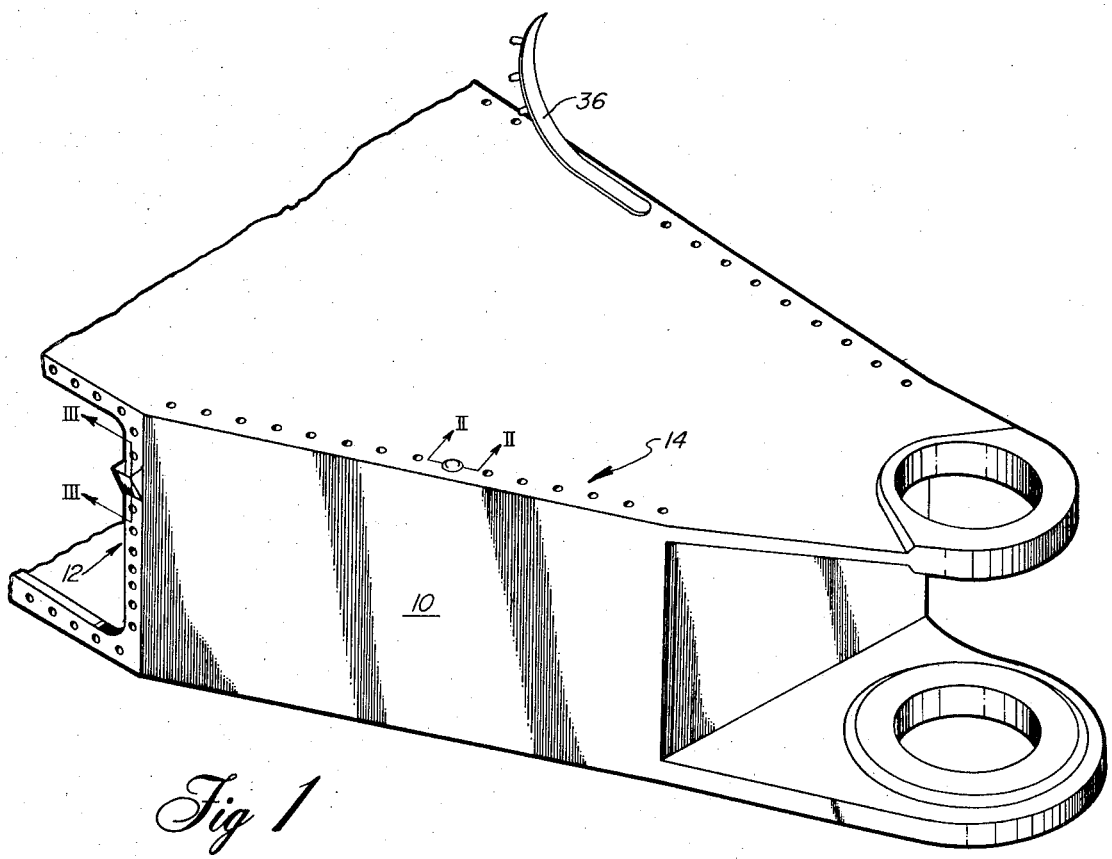
FIG. 1 is an isometric view of a built up structural member showing placement of typical holes which are capable of being checked by the herein disclosed process.

The rubber preferably employed is a room temperature vulcanizing silicone rubber such as that designated RTV-11 by The General Electric Silicone Division of Waterbury, N.Y. Any minimum adhesion — maximum cohesion rubber, such as room temperature vulcanizing rubber will work satisfactorily. This rubber may be stored six months at room temperature, but should be restirred following storage. If extended storage periods are necessary, it should be stored at 40°F or below.

Any hydrocarbon solvent will work as a diluent but the one preferred is chosen for its high flash point. This feature adds a significant and desirable degree of safety in industrial utilization. The preferred diluent, Phillips "Soltrol" 200, is the designation given to that particular high flash naptha produced by Phillips Petroleum Company of Bartlesville, Ok., and has a flash point of over 200°F. Utilization of a naptha possessing that high a flash point is not necessary, but this quality provides a substantial safety factor in use.

The black iron oxide preferred is distributed commercially by the Ferro Corporation of Cleveland, Oh under the name of F-3794 Black. $Fe_3O_4$ is a black iron oxide which is entirely satisfactory, and it is also possible to use $Fe^o$ or metallic iron powder since it is also ferromagnetic. In other words, iron or any ferromagnetic powder having a particle size of from 5 to 60 microns may be used. It must be a powder that is susceptible to a magnetic field and black is the preferred color because of the higher resulting definition in the replicas obtained by casting the material.

The present invention is a method of casting replicas of inspection areas such as holes, although not limited thereto, using a rubber base mixture containing magnetic particles which are used as a sensitizing agent. Replication, or casting, is well known and has long been practiced. The distinction to be noted in this invention is that previous replication methods were limited to ascertainment of surface configurations and not integrity, whereas the herein disclosed method permits discovery of subsurface faults in addition to clear and unmistakeable permanent indication of the minutest surface faults or discrepancies in or on formerly inaccessible locations.

When the mixture of the present invention of a rubber base containing magnetic particles is placed in the area to be inspected and a magnetic field imposed, the magnetic particles migrate to any cracks or flaws which are present. When the casting material cures and is removed from the test area, an accumulation of magnetic particles in distinct dark lines reveals the presence and location of cracks in the area.

It would be expected that magnetic particles dispersed in a vulcanizing material such as silicone rubber would migrate to cracks in a magnetic field. In fact, this action will not properly take place unless the material is formulated from specific ingredients in a specific manner and applied and magnetized by specific techniques as herein taught.

The most important factors involved in the formulation of the herein disclosed casting material are:

1. Optimum concentration of magnetic particles: If too low, insufficient migration takes place. if too high, a poor contrast results between the crack display and the background color of the casting.

2. Optimum size of magnetic particles: If too fine, the particles are less sensitive to magnetic attraction; if too coarse, sharp crack indications are not produced.

3. Optimum viscosity of vulcanizing material: If too high, magnetic particle migration will not take place. If too low, too strong a magnetic flux background obscures indications. Viscosity is adjusted by the addition of diluents. The casting material herein disclosed contains a silicone rubber base. Diluents for silicone rubber recognized by the art are normally silicone oils. However, to reduce the viscosity of even the thinnest silicone rubber available to allow proper migration of magnetic particles would require more silicone oil than is compatible with the rubber. Moreover, the resultant casting would leave excessive residual silicone on the part. For these reasons the herein disclosed casting material is diluted with hydrocarbon solvent, even though the materials of this combination are not normally employed together. Any hydrocarbon solvent will work in the instant invention, but the preferred one is a normal saturated hydrocarbon chosen for its high flash point and low volatility.

4. Optimum type and quantity of catalyst: If too fast curing, magnetic particle migration will be prematurely halted. If too slow, the inspection time will be unduly prolonged. The type of catalyst found to be most beneficial in the present invention comes from the general class of catalysts known as metallic soaps. More particularly it has been found that dibutyl tin dilaurate and stannous octoate are preferred.

5. Blending of ingredients: The magnetic particles must be dispersed in a manner to properly break up agglomerates but without inducing a static charge or reducing particle size.

Experience has proved that the factors set out above are inter-related and are related to the magnetic field requirements for inspection. Experimentation has resulted in three optimum mixtures (shown in Table I) and several specific process applications (shown in Table II).

Table I provides three optimum mixtures of the base material.

TABLE I

Specific Base Material Mixtures

| Mixture | Components | Parts by Weight |
| --- | --- | --- |
| MR-1 | Room Temp. Vulcanizing Rubber | 100 |
| | High Boiling Point Naptha | 12.5 |
| | Black Iron Oxide | 2 |
| MR-2 | Room Temp. Vulcanizing Rubber | 100 |
| | High Boiling Point Naptha | 50 |

TABLE I-Continued

| Mixture | Specific Base Material Mixtures Components | Parts by Weight |
|---|---|---|
| | Black Iron Oxide | 2 |
| MR-3 | Room Temp. Vulcanizing Rubber | 100 |
| | High Boiling Point Naptha | 30 |
| | Black Iron Oxide | 2 |

Usage of the mixtures of Table I is dictated by the application contemplated, as shown in Table II, following.

Table II provides optimum processes for application of the mixtures found in Table I.

The catalysts suggested for use in the processes set forth in the above Table II are not only ones utilizable. Any catalyst possessing the same characteristics would be acceptable. Thermolite 12 is the trade designation given to the preferred dibutyl tin dilaurate by its manufacturer, M and T Chemical Corporation Rahway, N.J., while Nuocure 28 is a stannous octoate catalyst possessing the characteristics found to be most desired for the situation described above and is commercially available from Tenneco Chemicals, Inc., Long Beach, Calif.

Table III provides the optimum degrees of magnetism application for the processes shown in Table II.

TABLE III

| | Specimen Magnetism Application | |
|---|---|---|
| Process | Base Magnetic Metal | Magnetic Base Metal Under Paint or Non-Magnetic Coating |
| A | 30 Seconds at 30–50 Gauss Flash Method may be used | 60 Seconds at 200–600 Gauss |
| B | 30 Seconds at 30–50 Gauss | 60 Seconds at 200–600 Gauss |
| C | 30 Seconds at 30–50 Gauss | 60 Seconds at 200–600 Gauss |
| D | 30 Minutes at 10–20 Gauss | 30 Minutes at 10–20 Gauss |
| E | 30 Seconds at 30–50 Gauss | 60 Seconds at 200–600 Gauss |
| F | 30 Seconds at 20–50 Gauss | 60 Seconds at 50–600 Gauss |
| G | 30 Seconds at 20–50 Gauss | 60 Seconds at 50–600 Gauss |

TABLE II

| Process | Application | Cure Time | Pot Life | Specific Base Material Mixture | Catalyst | Mix Ratio |
|---|---|---|---|---|---|---|
| A | Standard (i.e.) General Use | 6 Hrs. at Room Temp. 2 Hrs. at 200°F | 30 Min. | MR-1 | Dibutyl Tin Dilaurate | 20 Grams Base 4 Drops (.08g) Catalyst |
| B | For Rapid Inspection | 2 Hrs. at Room Temp. 15 Min. at 200°F | 20 Min | MR-3 | Dibutyl Tin Dilaurate | 20 Grams Base 30 Drops (.6g) Catalyst |
| C | For Fastest Inspection One or Two Hole Inspection Only | 20 Min. at Room Temp. 5 Min. at 200°F Temp. | 2 Min. | MR-2 | Stannous Octoate | 7 Grams Base 1 Drop (.02g) Catalyst |
| D | Most Sensitive Use on Difficult to Magnetize Parts | 8–10 Hrs. at Room Temp. 2½ Hrs. at 200°F | 30 Min. | MR-2 | Dibutyl Tin Dilaurate | 20 Grams Base 10 Drops (.2g) Catalyst |
| E | Past Inspection (Falls between Process B & C) | 1 Hr. at Room Temp. 10 Min. at 200°F | 10 Min. | MR-2 | Dibutyl Tin Dilaurate Plus Isopropyl Alcohol Water Additive | 20 Grams Base 50 Drops (1.0g) Catalyst 10 Drops of Additive Consisting of 50% Water & 50% Isopropyl Alcohol (By Volume) |
| F | Used Where Fast Sensitive Inspection is Desired | 3 Hrs. at Room Temp. 30 Min. at 200°F | 30 Min. | MR-2 | Dibutyl Tin Dilaurate | 20 Grams Base 30 Drops Catalyst |
| G | Used Solely on Flat Surfaces | 10–15 Mins. at Room Temp. | Not Applicable | MR-2 | Equal Parts of Stannous Octoate & Naptha | Not Applicable Since it is Sprayed or Painted on as an Overcoat |

Cure time, pot life, mix ratio and gauss application strengths and times specified above have been arrived at by experimentation and experience and are considered as optimum rather than mandatory.

The composition hereinafter will be referred to generally as "Magnetic Rubber" for the purposes of simplicity. This term is used in an effort to identify the composition without limiting it to any specific ratio of ingredients except as herein specified. While all formulations of the magnetic rubber contain essentially the same ingredients, different proportions, or ratios, are incorporated in accordance with applicable inspection requirements.

As previously stated, Table I above gives the components and parts by weight of three (3) optimum mixtures of the magnetic rubber inspection material. Table II shows seven (7) typical processes for application of magnetic rubber mixtures. Table III sets out optimum intensities and duration periods for the application of magnetism.

From the above tables it is seen, for instance, that the first process, process A, would be used when a large number of holes are to be inspected and results are not required for several hours. The cure time is approximately six (6) hours with a pot life of approximately thirty (30) minutes. (Pot life is defined as maximum time allowable between addition of the catalyst and application of magnetism to the filled hole.) The 30 minute pot life is sufficient to fill and magnetize a given number of holes (about 40 in this instance) for each quantity of rubber-catalyst mixture. Process B, for example, is used when results are needed within a couple of hours. The cure time is about two (2) hours with a comparative pot life of approximately twenty (20) minutes. This would be sufficient to fill and magnetize a lesser number of holes per catalyst mixture. A third possibility would be the use of process C when results are needed as soon as possible. For example, a cure time of twenty (20) minutes with a pot life of two (2) minutes. Only a single hole per catalyst mixing would normally be inspected with this formulation. Additionally, a fourth process, process D, is suggested when very small, tight cracks are suspected or the part is massive or otherwise difficult to magnetize properly. The application characteristics are essentially the same as the first process mentioned. Normally process D utilizes permanent magnetism as opposed to use of an electromagnet.

Other processes are available and are also shown in the preceding Table II. For example, process E offers a compromise between process B and process C. Similarly, process F is a compromise between process C and process D and affords a process which in addition to being fast curing is also highly sensitive. Choice of process is dictated by the particular application involved and is determined by experience.

It is to be noted that low humidity causes an extended cure time. For this reason the additive containing water, referred to in process E, is blended in. The step of blending in water is to overcome the extended cure time caused by low humidity and is applicable to any of the processes shown in Table II except processes C and G.

A further process, process G, is useful in certain situations. In this process the uncatalyzed rubber (MR-3) mixture is applied to the surface to be inspected by brushing or spraying it on in a thin layer. The magnetic field is then applied in the normal manner. The catalyst is next applied by spraying a mixture consisting of equal parts of stannous octoate and naphtha. Two (2) minutes are allowed for partial curing and finally, an overlay of silicone rubber, to which has been added stannous octoate catalyst in the ratio of 1 drop (0.02g) per 3 grams rubber is added. This increases the replica thickness and provides structural integrity. Following complete cure (10–15 minutes), the replica is removed for examination.

Utilization of this "paint-on" technique provides a high degree of sensitivity and is comparatively fast setting. This technique, while only applicable to accessible surfaces, as opposed to holes, is frequently useful since it may be applied to all surfaces, vertical or horizontal. It may even be applied to the underside of a part, similar to a ceiling, for instance. This process eliminates the complicated damming procedures formally used in the inspection of bottom horizontal areas.

The formulations set forth in the following table, Table IV, represent typical mixtures used to balance the advantages and disadvantages obtained by usage of the individual components. It is not to be construed that usage exactly as set forth indicates that these are the sole proportions in which the magnetic rubber material may be mixed. Those mixtures set forth serve as examples on which exhaustive studies have been made. These specific formulations are preferred and are indicated as such as opposed to the general classification.

Testing has proven that there are ranges or variations allowable in the parts-by-weight ratios of the various ingredients as shown in Table IV and is therein indicated as being the general parts by weight.

Table IV is predicated upon the inclusion of 100 parts by weight of the silicone and adding sufficient diluent to obtain the desired viscosity within a certain range. This is important because obtaining the optimum working viscosity is a most important criterion in this process.

TABLE IV

| Ingredients | | Example Formulations | | |
| --- | --- | --- | --- | --- |
| | | MR-1 | MR-2 | MR-3 |
| | | Parts by Weight | | |
| Silicone Rubber (any room temperature vulcanizing rubber) | General | 100 g. | 100 g. | 100 g. |
| | Specific | 100 g. | 100 g. | 100 g. |
| High Boiling Point Naptha (sufficient to obtain the desired or functional viscosity measured in poises as indicated) | General | 30–120 poises | 1–10 poises | 10–30 poises |
| | Specific | 40 poises | 5 poises | 20 poises |
| Black Iron Oxide (particle diameter 5–60 microns) | General | 0.1–10.0 g. | 0.1–10.0 g. | 0.1–10.0 g. |
| | Specific | 2 g. | 2 g. | 2 g. |

As can be seen, the viscosity of the formulation can range between 1 to 120 poises.

The technique or method of nondestructive testing employing the described materials will hereinafter be termed "Magnetic Rubber Inspection" or "MRI." "MRI" would include any of the processes of Table II with the accompanying application of magnetism indicated in Table III. This process involves the use of room temperature vulcanizing rubber containing black ferromagnetic powder to replicate the area to be inspected. A small magnetic field generated in the area to which the magnetic rubber has been applied causes the ferromagnetic particles to migrate, prior to setting up, or curing of the mixture to secondary magnetic fields created by cracks or other defects involving material integrity. Following cure, the solid rubber replica is removed from the surface being tested and a visual examination reveals not only a clearly discernable display of cracks present, but a representation of other surface conditions such as smoothness, drill damage, alignment and dimensional accuracy.

Numerous variables of formulations and application techniques are possible within the parameters specified. Formulation variables include types and concentrations of magnetic particles, diluents to control viscosity, types and quantities of catalysts and milling procedures to disperse the magnetic particles into the rubber. Application variables include the technique used in hole preparation (cleaning, taping, and placement of aluminum cups to hold the liquid rubber in horizontal voids), magnetization equipment and optimum fields, effect of coatings such as paints, flamesprayed metals, or platings, application time (pot life) and cure time for various catalyst systems, methods of examining replicas, methods of rating observed indications, post cleaning and demagnetization of inspected areas.

Uncoated metal requires a field of 20 to 40 gauss for satisfactory inspection. This field may be applied with permanent magnets or DC electromagnets. The proper field is conveniently introduced in D6ac steel, for instance, by energizing an electromagnet at a high setting for an instant, for example approximately 2 seconds, then turning it off. The resulting magnetic field remains at about 30 gauss. By adjusting the span of the magnet with auxiliary pole pieces, various configurations and varied areas can be covered, or an area covering several holes can be magnetized simultaneously.

Test specimens of magnetic metal coated with paint or plastic require more magnetism than bare surfaces. Each hole requires 100 to 600 gauss, depending upon the thickness of the coating.

After removal of the cast replicas, they may be examined with a bench microscope. A power of 5 to 10X has proved best in applications to the present for viewing of the cast replica. In proper situations removal of the cast replica is abetted by use of a suitably sized pushing rod. In some circumstances (such as series of holes to be inspected), the test replicas may be connected by a continuous strip of the material, thus retaining several replicas in a fixed relationship.

Following inspection, by viewing of the cast replica, the area may be easily demagnetized (if required) by applying an AC electromagnet. A residual field of 0 to 1 gauss is easily attained. The test part may then be cleaned with a suitable solvent. Laboratory tests have shown that trichloroethylene effectively removes any residual silicones so that the part may be painted, plated, or coated with sealant and no loss of adhesion results.

Applications of the MRI process are numerous. They include inspection of drilled holes for cracks before and after testing, evaluation of drilling and drill quality of holes, dimensional and fit-up checks in inaccessible areas and the monitoring of crack initiation and rate of crack propagation in fatigue testing. It is possible to inspect a wide range of hole sizes. The smaller rivet holes and threaded holes cannot be adequately inspected by any other means. Cast replicas have been used to demonstrate and provide a permanent record of undesirable misalignment in holes through multi-layer structural joints. An additional valuable use of the MRI process is in the monitoring of crack growth in drilled holes during fatigue testing. The cast replicas show the growth of cracks from initiation in tool marks to a predicted catastrophic failure location.

No minimum crack size limitations have been established. Even the very smallest of cracks, verified by sectioning and breaking open holes, have been detected. These have included cracks as small as 0.002 inches long and 0.0001 inches wide.

Figure 2:
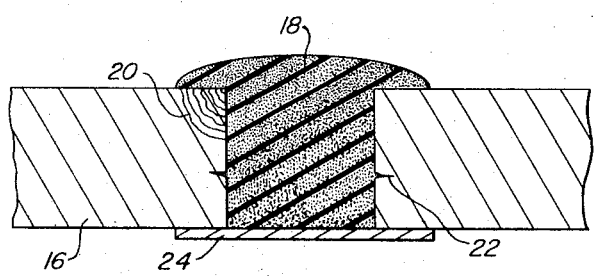
FIG. 2 is an elevational view in cross section of a workpiece having a vertical recess filled with the magnetic rubber material of the invention.
Figure 3:
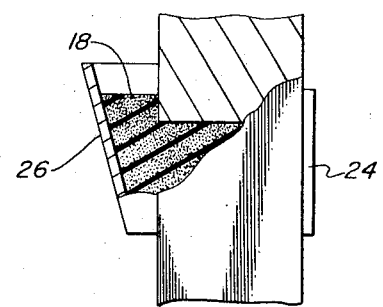
FIG. 3 is an elevational view partially in cross section of a workpiece having a horizontal recess filled with the magnetic rubber.

FIG. 1 is an isometric view of a built-up structural member 10 wherein the horizontal holes 12 and the vertical holes 14 contained therein are typical of the type which are most easily examined by the herein described magnetic rubber inspection system and relate them to FIGS. 2 and 3. As apparent from FIG. 1, holes located in many positions upon workpieces such as member 10 are simply not feasibly accessible to inspection by any method other than that shown herein.

FIG. 2 is an elevational view in cross-section taken on the line II—II of FIG. 1 and shows a workpiece 16 containing a prepared vertical fastener recess therein which is filled with magnetic rubber 18. Workpiece 16 is shown as having a crack 20 and defect 22. Vertical holes, as shown in FIG. 2, may be prepared by placing mylar or cellophane tape 24 beneath the hole as previously described.

Horizontal holes 12 such as are shown in FIG. 3 may be similarly prepared by placing mylar or cellophane tape 24 on one side and an aluminum cup 26, or some other similar type of damming device, on the other side. This is to flow magnetic rubber 18 into the hole. After pouring of the magnetic rubber 18 into the hole, a pin or needle should be used to punch a hole in the tape 24 at the hole's highest point to release possible trapped air. If locating an aluminum cup 26 or taping the hole cannot be accomplished, vacuum putty or Dux-Seal may be utilized to make a dam or to seal the hole.

Figure 4:
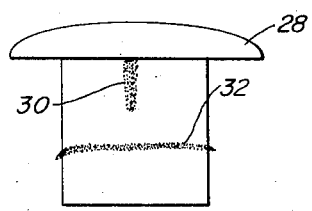
FIG. 4 is an elevational view of the cured replica of the invention after removal from a workpiece such as shown in FIG. 2 and rotated 90°.

FIG. 4 is an elevational view of a replica 28, i.e., the now solidified magnetic rubber composition 18, removed from FIG. 2 and rotated 90°. During cure and while magnetism was applied to the structural elements, the particles in the cast magnetic rubber have migrated and concentrated, and following cure and removal visibly indicate the crack location 30 and defect location 32.

Figure 5:
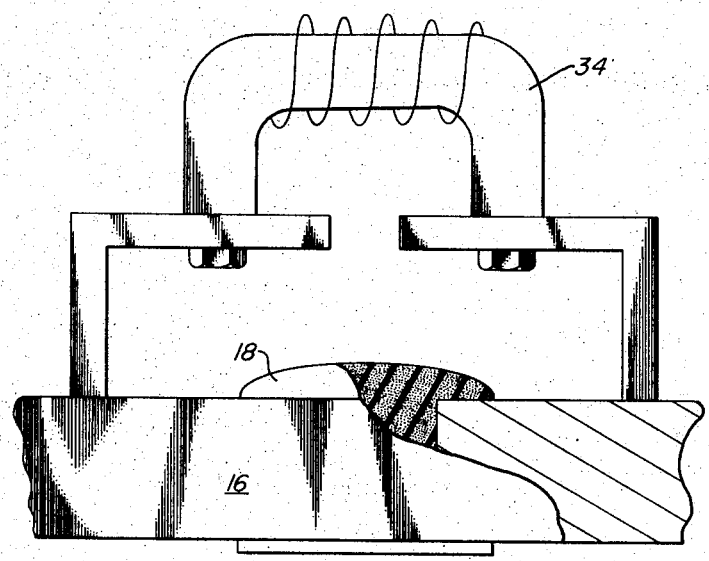
FIG. 5 is an elevational view partially in cross section of a workpiece and a magnet indicating one manner in which a magnetic field may be applied to the test area.

FIG. 5 is illustrative of the positioning of a magnet 34 over the workpiece 16 after the magnetic rubber 18 has been poured. Placement of magnet 34, as indicated, gives a workable arrangement without the necessity for magnetizing the entire metal workpiece 16. The magnet may be made so that it is extendable thus permitting a multiplicity of test holes to be magnetized simultaneously, for an application such as the strip shown at 36 in FIG. 1.

Figure 6:
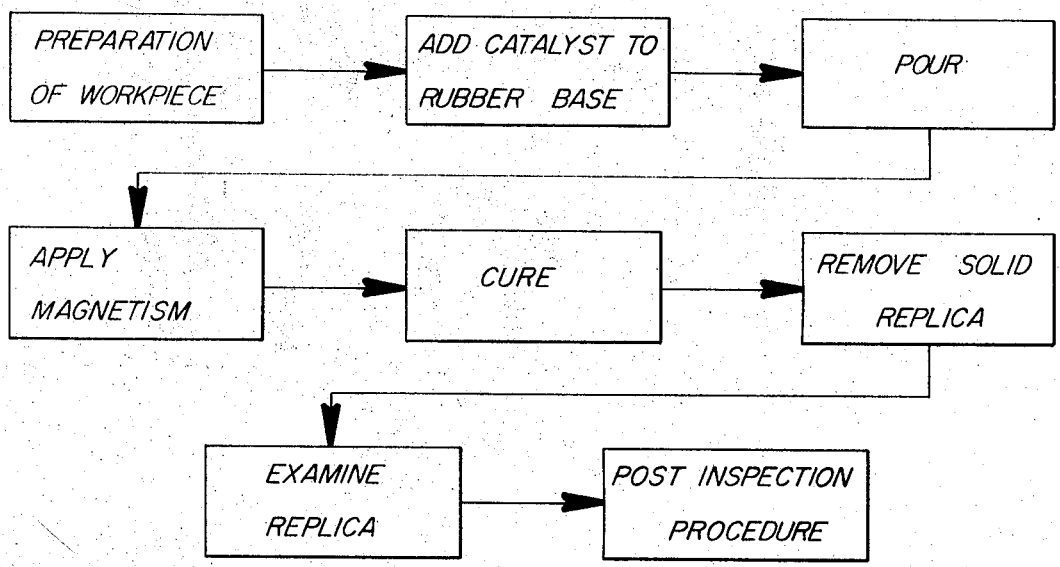
FIG. 6 is a flow chart of the inspection process.

FIG. 6 is a flow chart of the inspection process, and as indicated therein, the area to be inspected must first be cleansed of all dirt, grease, sealant or any other contaminates. Cleansing of the area may be accomplished by using a stiff brush and cheesecloth with trichloroethylene solvent. Lint may be removed with the assistance of compressed air. Any specific configuration to be inspected should be identified. The identification may become incorporated as part of the replica to be formed by the magnetic rubber.

The next step in the process is the addition of catalyst to the rubber base and stirring to assure a consistent and thorough mix.

Pouring or insertion of the magnetic rubber may be accomplished by using a cup to pour directly into the hole to be inspected or by use of a plastic syringe for difficult to reach holes or areas. Air entrapment should be avoided by venting pin holes. More holes should not be filled from a batch of magnetic rubber than can be magnetized within the formula pot life.

After pouring of the magnetic rubber a magnetic field is applied to the area. This may be applied with permanent magnets or DC electromagnets. Allowing sufficient time for curing is the next step, and this will vary depending upon the chosen catalyst, formulation and temperature.

The required magnetism to obtain an optimum magnetic field is called out in Table III above. For optimum results the field strength depends upon the specimen material and the mixture used. The optimum results should be determined by examination of the magnetic field background in the replicas. If the background is too strong or weak, the applied field should be adjusted to obtain the optimum background for good reading of the replica. The "flash" method of magnetism has proven very successful on D6ac steel and other similar metals possessing the characteristic of retaining residual magnetism. This method consists of applying a high magnetic field for a very short time. Simply "on" and "off" with the electromagnetic switch. When using this method, it is necessary to wait at least 30 seconds before applying magnetism to the area around adjacent holes. For best results on the replica, the magnetic field should be applied to the area of the hole, delay 30 seconds and then apply a second field 90° from the original application.

Upon curing, the resultant solid replicas are extracted. It may be necessary to use extraction rods to facilitate removal.

For ease in handling and examination, where the holes are suitably situated, the resultant rubber plugs or replicas 28 (such as are shown in FIG. 4) may be connected by a continuous strip of rubber as indicated at 36 in FIG. 1. This is effected by over-pouring, or pouring a strip of rubber between the holes at the time they are being filled. This process is limited, by practicality, to adjacent vertical holes.

Replicas may be removed by first removing the mylar tape, cups or dams, etc., then gently lifting the replicas from the open side while pushing from the closed side. Pushing rods of various sizes will facilitate this operation.

Following removal of the cast replicas, they are examined. This is most effectively accomplished by the aid of a bench microscope with a power of 5 to 10X.

After the examination the post inspection procedure is performed. This consists of demagnetizing the area (if required) by applying an AC electromagnet. A residual field of 0 to 1 gauss is easily attained. The test part may be then cleansed with suitable solvent. Laboratory tests have shown that trichloroethylene effectively removes any residual silicones so that the part may be painted, plated or coated with sealant and no loss of adhesion results.

All of the previously described inspection methods provide an opaque replica, and this is generally preferred; however, it has been found desirable in certain situations that a transparent replica be obtained. This transparent replica provides easier examination and inspection, particularly in crack detection on flat surfaces.

Any room temperature curing material of a plastic nature which is transparent will work. A plastic material is used because a material capable of transforming from a liquid to a solid state is necessary. This feature permits migration of the magnetic particles while the base is in the liquid state and affords fixed entrapment after solidification or curing.

One material found useful in forming transparent replicas is sold commercially by the Silicone Division of General Electric of Waterbury, N.Y. This material is referred to by their trade names of RTV-602 and SRC-05.

RTV-602 is their designation for dimethyl polysiloxane which is a transparent, liquid, room temperature vulcanizing rubber and SRC-05 is an amine type of catalyst used in the curing of this rubber. To this mixture is added the ferromagnetic particles used in the other mixtures and the same type of high boiling point naptha utilized in the other herein described mixtures as a diluent.

The optimum mixture for inspection in this case is:
a. 10 ppw of dimethyl polysiloxane
b. 5 ppw of naptha diluent
c. 0.3 ppw of iron oxide
d. 0.3 ppw of an amine catalyst The permissible spread of these ingredients is as follows, based on 10 ppw of dimethyl polysiloxane:
a. 10 ppw of dimethyl-polysiloxane
b. 3–8 ppw of naptha diluent
c. 0.15–0.5 ppw of iron oxide
d. 0.15–0.5 ppw of an amine catalyst.

In summary, the present invention provides a method of inspecting relatively inaccessible areas, such as holes, by using a castable material to form replicas of the surface being examined. Incorporated into this castable material are magnetic particles which, when subjected to a magnetic field, migrate to the defective area and thus provide an indication of the type and location of any defects in the area being inspected.

The method utilized is applicable to flat surfaces or holes, either vertical or horizontal. The ingredients utilized in the material are non-hazardous and the replicas obtained are permanent and capable of storage, thus providing off-site inspection capability.

I claim:

1. A composition forming a room temperature vulcanizable casting material for precise visual inspection of magnetically inductive substances by application of the material directly to a workpiece to be inspected, solidifying in situ to elastic flexible form and removing the casting, for determining and permanently recording the presence of a flaw or flaws in the workpiece by migration of magnetizable particles in the composition to the flawed area when the workpiece and casting material are subjected to magnetic flux comprising:

a base formulation having
- a. about 100 parts by weight silicone rubber compound, vulcanizable at room temperature by addition of suitable catalyst material thereto, and comprising a substantially linear polydimethyl siloxane
- b. about 0.1 to 10.0 parts by weight of ferromagnetic particles in the size range of from about 5 to about 60 microns;
- c. a liquid naphtha hydrocarbon diluent in an amount sufficient to adjust viscosity of the formulation to within a range of about 1 to about 120 poises; and about about 0.2 to about 6 parts by weight per 100 parts of said base formulation of a catalyst comprising a metallic soap for vulcanizing said silicone rubber compound to said flexible elastic form; said rubber differing in color from said ferromagnetic particles to provide visual contrast between said composition as a whole and an accumulation therein of said particles at the area of a detected flaw when said composition is cured or vulcanized.

2. The composition defined by claim 1 wherein said metallic soap comprises a compound selected from the group consisting of stannous octoate and dibutyl tin dilaurate.

3. The composition defined by claim 1 wherein said formulation has a viscosity within the range of about 1 to about 10 poises.

4. The composition defined by claim 2 wherein said catalyst consists of about 0.3 parts by weight of stannous octoate per 100 parts of said base formulation.

5. The composition defined by claim 2 wherein said catalyst consists of about 5 parts by weight of dibutyl tin dilaurate per 100 parts of said base formulation.

6. The composition defined by claim 2 wherein said catalyst consists of about 1 part by weight dibutyl tin dilaurate per 100 parts of base formulation.

7. The composition of claim 2 wherein said catalyst is dibutyl tin dilaurate employed in parts, by weight, of about 3 parts per 100 parts of said base formulation.

8. The composition of claim 1 wherein said ferromagnetic particles are selected from the group consisting of black iron oxide ($Fe_3O_4$), metallic iron, metallic nickel and mixtures thereof.

9. The composition of claim 1 wherein said diluent is a naphtha hydrocarbon having a flash point exceeding 200°F.

10. The composition of claim 1 wherein water is added to reduce the time required for curing the composition.

11. The composition of claim 1 wherein said rubber is present as about 100 parts by weight, said naphtha diluent is present as about 50 parts by weight and said ferromagnetic particles are black iron oxide ($Fe_3O_4$) present as about 2 parts by weight, said formulation having a viscosity of about 5 poises.

* * * * *